United States Patent [19]
Dobson

[11] Patent Number: 5,717,870
[45] Date of Patent: Feb. 10, 1998

[54] SERIAL PORT CONTROLLER FOR PREVENTING REPETITIVE INTERRUPT SIGNALS

[75] Inventor: William Gordon Keith Dobson, Douglasville, Ga.

[73] Assignee: Hayes Microcomputer Products, Inc., Norcross, Ga.

[21] Appl. No.: 329,728

[22] Filed: Oct. 26, 1994

[51] Int. Cl.$^6$ .................................................. G06F 13/24
[52] U.S. Cl. .................................................. 395/250
[58] Field of Search .................. 364/DIG. 1 MS File, 364/DIG. 2 MS File; 395/250

[56] References Cited

U.S. PATENT DOCUMENTS

| | | | |
|---|---|---|---|
| 4,453,229 | 6/1984 | Schaire | 395/250 |
| 4,823,312 | 4/1989 | Michael et al. | 395/250 |
| 4,949,333 | 8/1990 | Gulick et al. | 370/32 |
| 5,140,679 | 8/1992 | Michael | 395/286 |
| 5,155,810 | 10/1992 | McNamara, Jr. et al. | 395/250 |
| 5,167,020 | 11/1992 | Kahn et al. | 395/250 |
| 5,179,661 | 1/1993 | Copeland, III et al. | 395/250 |
| 5,241,660 | 8/1993 | Michael et al. | 395/250 |
| 5,247,617 | 9/1993 | Olson | 395/250 |
| 5,247,671 | 9/1993 | Adkins et al. | 395/650 |
| 5,265,255 | 11/1993 | Bonevento et al. | 395/733 |
| 5,278,956 | 1/1994 | Thomsen et al. | 395/250 |
| 5,280,628 | 1/1994 | Nakayama | 395/733 |

*Primary Examiner*—Robert B. Harrell.
*Attorney, Agent, or Firm*—Jones & Askew

[57] ABSTRACT

An improved input/output FIFO buffering device with expanded buffers for a universal asynchronous receiver/transmitter (UART) that includes scalable trigger levels for generation of an external service request is disclosed. Standard selectable trigger levels used in a type 16550 UART are provided as well as expanded scalable trigger levels to accommodate the larger buffers. The larger scalable trigger levels may be employed in a manner transparent to an application written for 16 byte buffers so as to physical accommodate higher data rates without requiring applications to know that more buffer space is used. A reinterruptable timer inhibits generation of an interrupt service request until a predetermined period of time after the most recent interrupt request has been serviced. The period of the timer is selectively programmable.

2 Claims, 6 Drawing Sheets

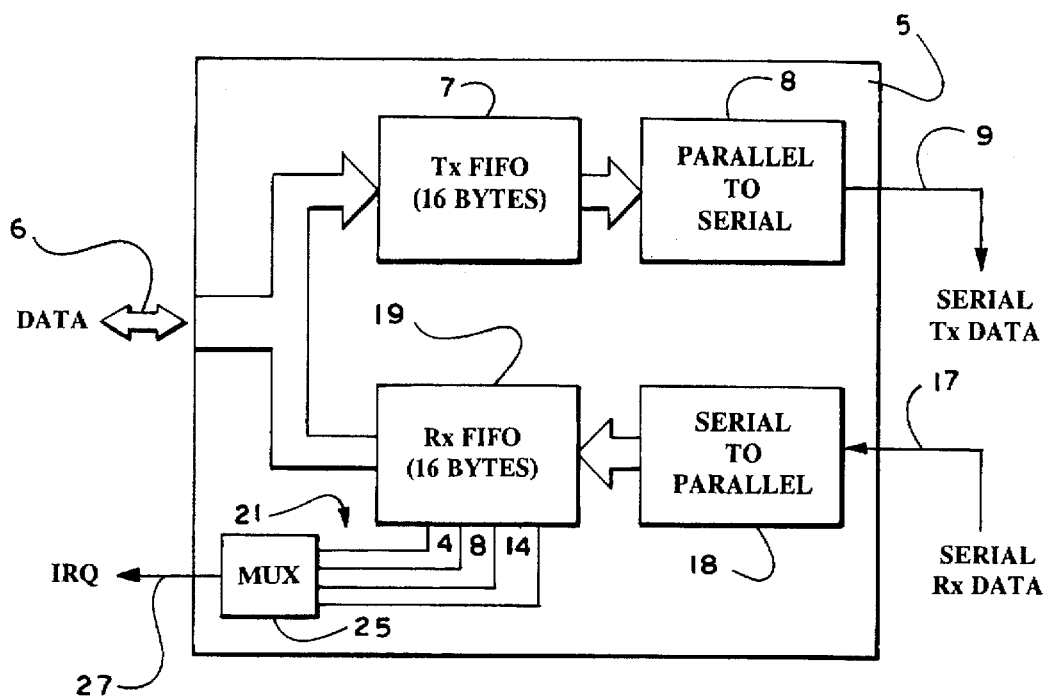
Fig_1 PRIOR ART
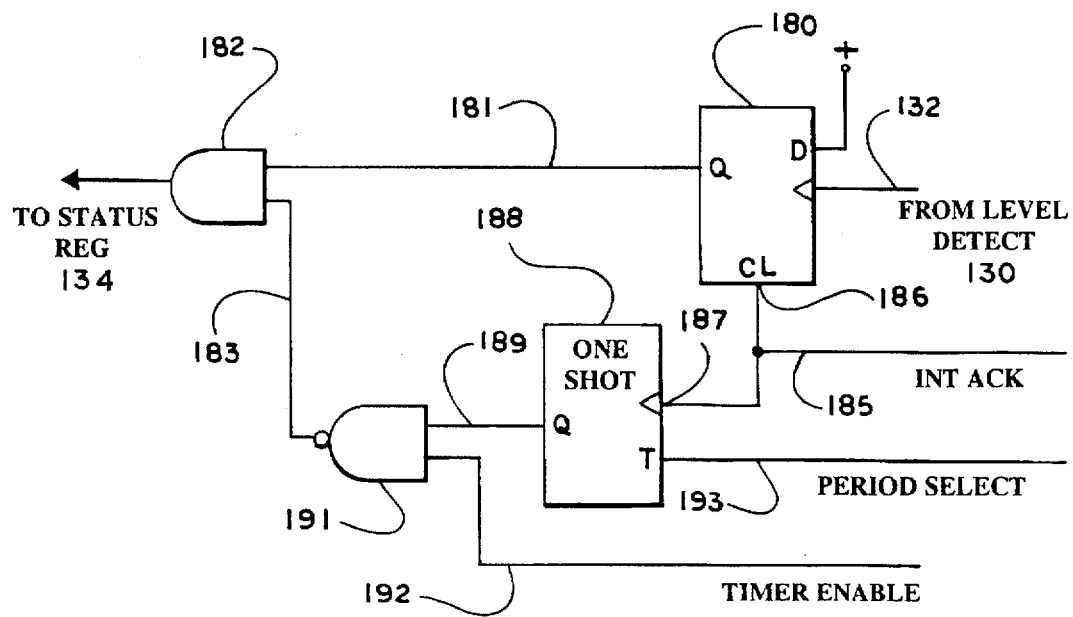
Fig_7

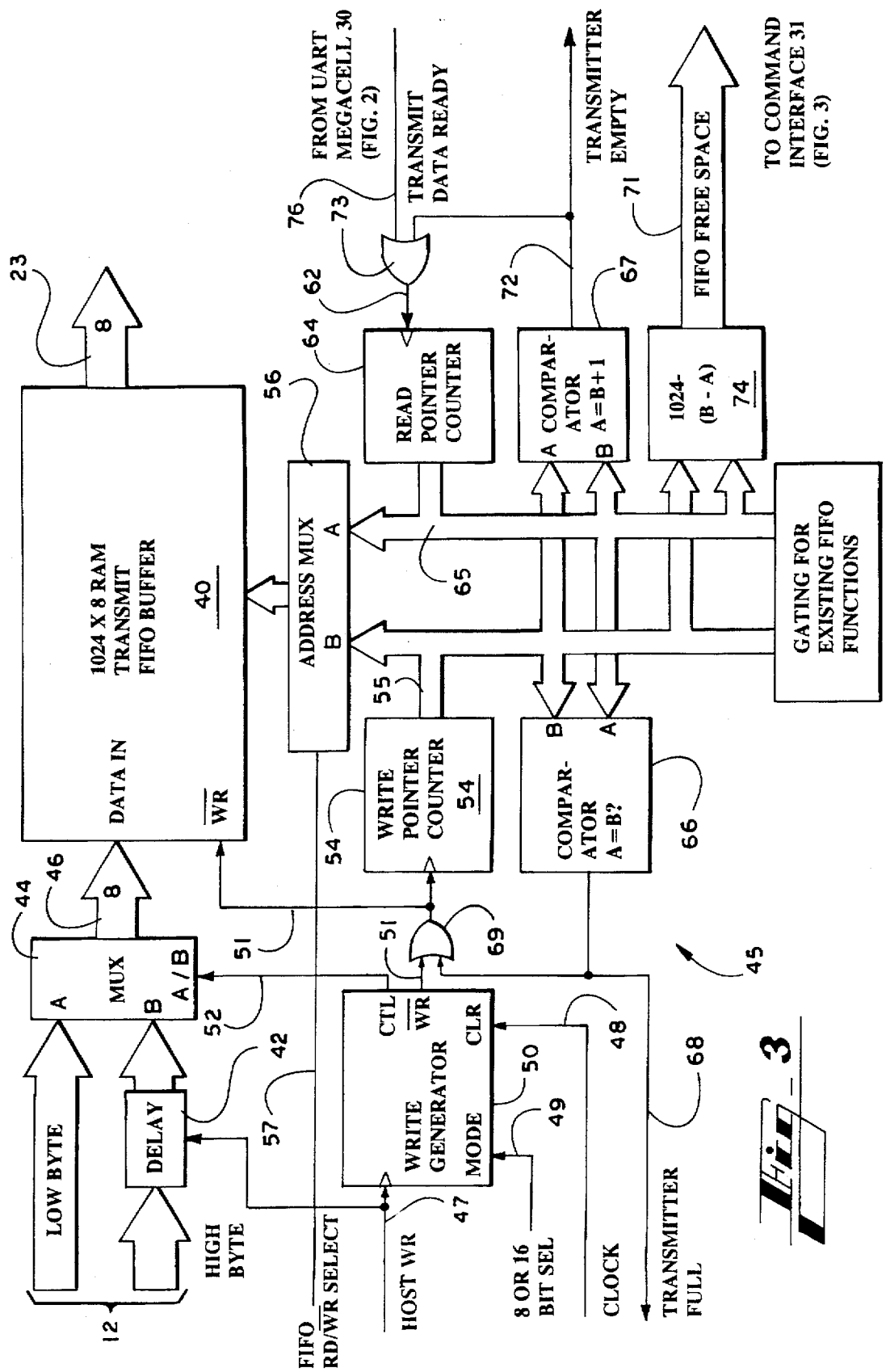

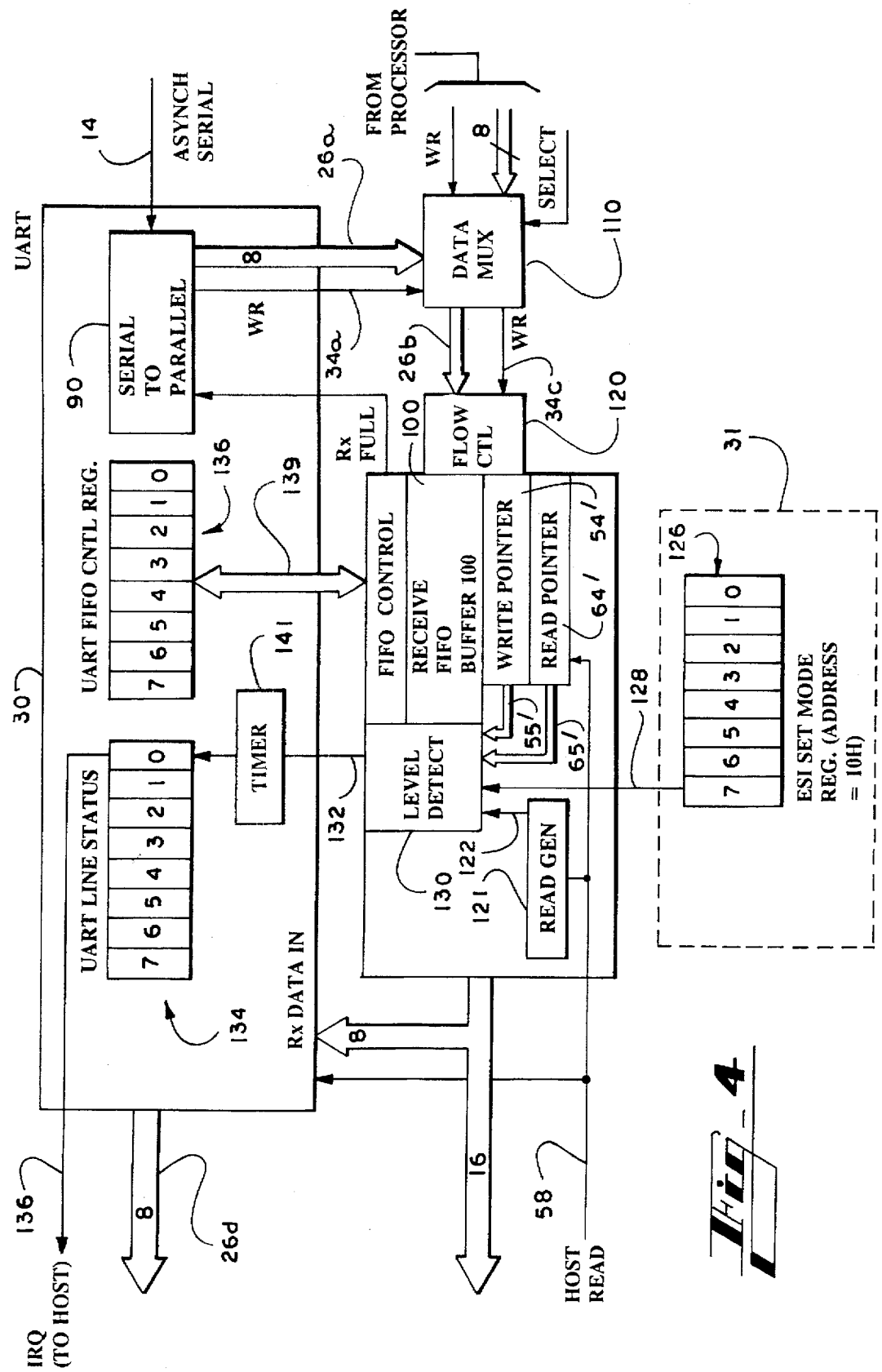

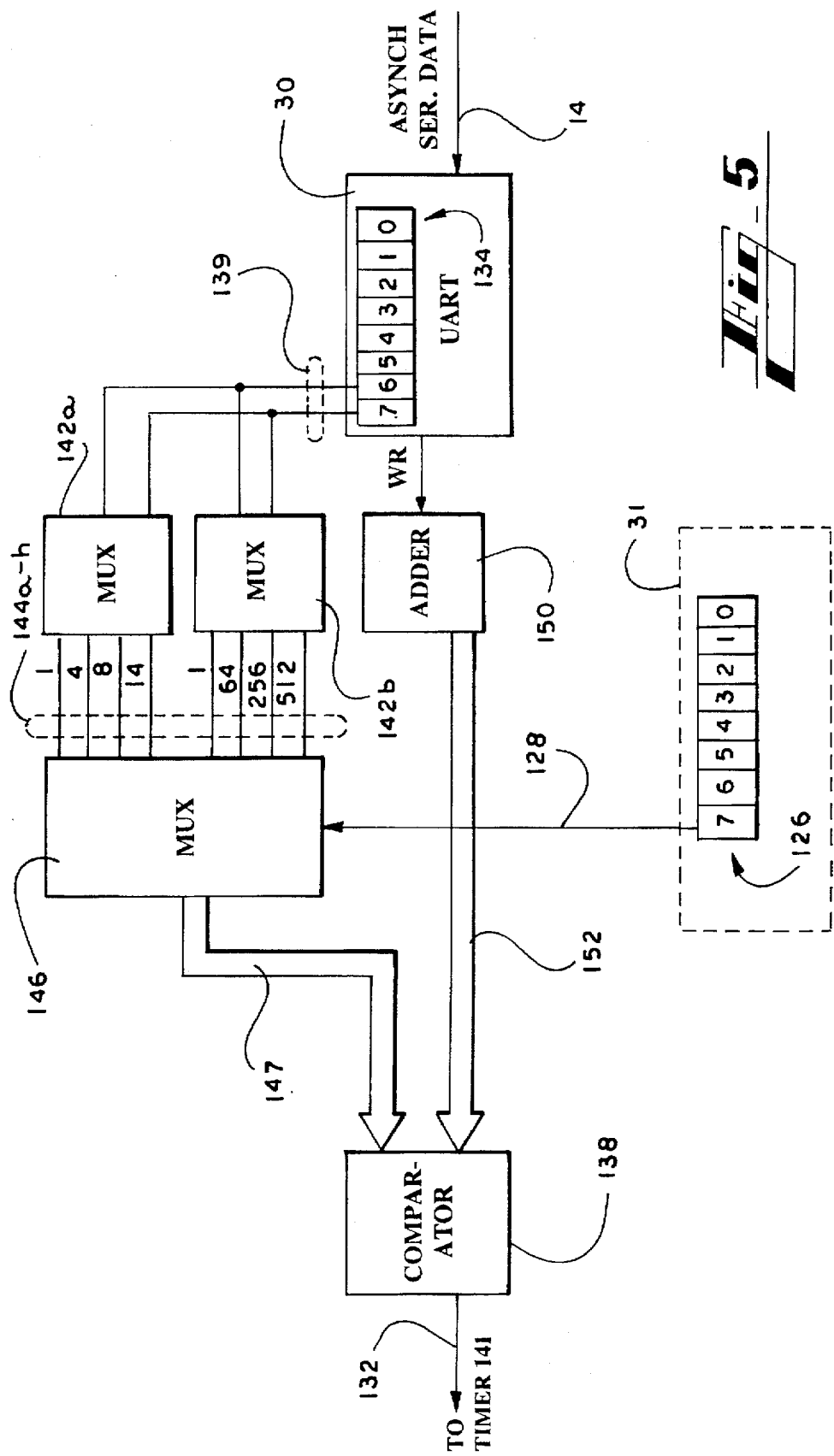

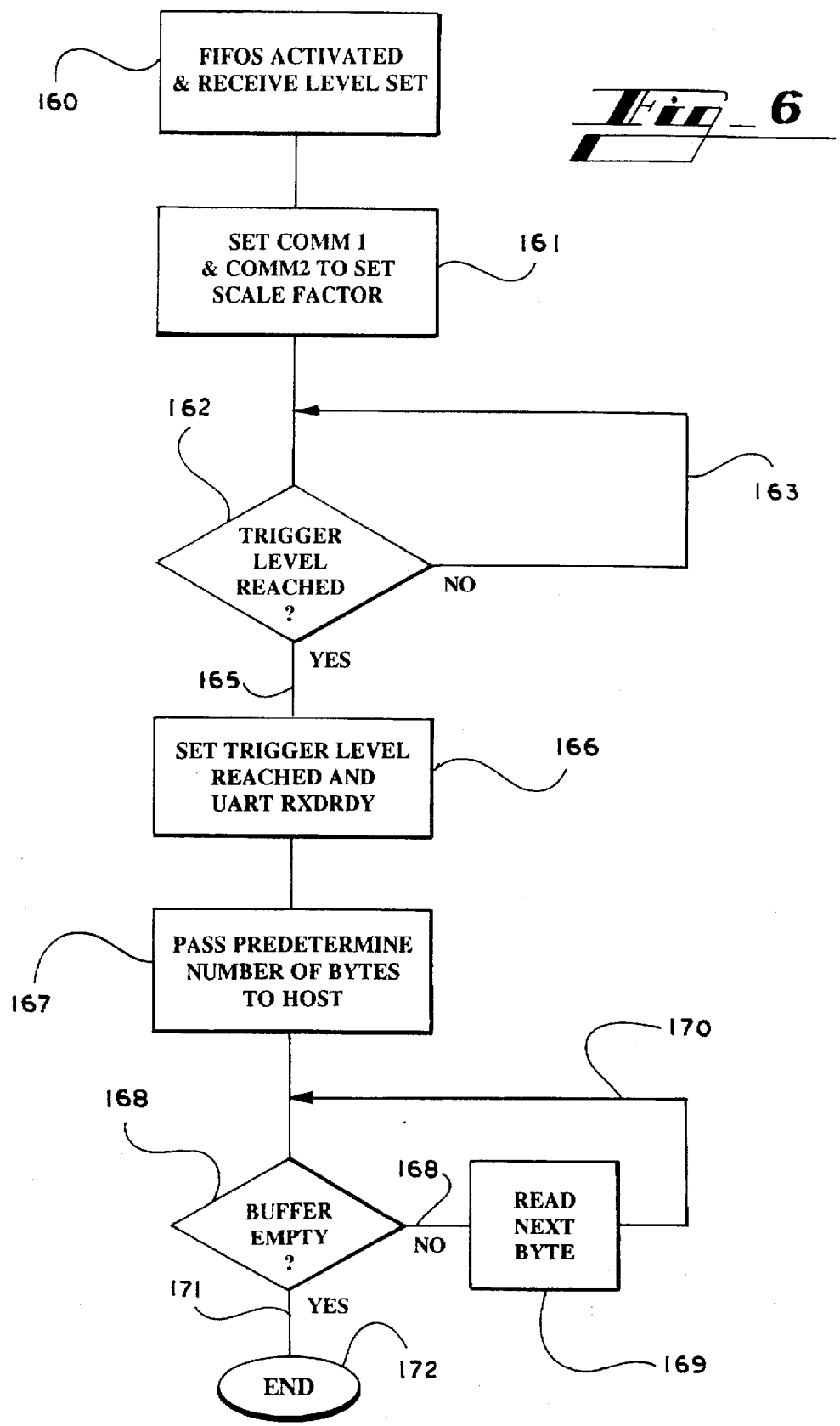
Fig_6

SERIAL PORT CONTROLLER FOR PREVENTING REPETITIVE INTERRUPT SIGNALS

TECHNICAL FIELD

The present invention is in the field of serial ports for small general purpose digital computers and more particular is an improved controller for buffering input and output data from a high speed serial port and controlling the generation of central processing unit interrupts in a manner that allows conventional data communications application programs to support very high speed serial data rates in a manner that is backwardly compatible with software written for conventional serial port devices.

BACKGROUND OF THE INVENTION

Bit serial communications have been the most used system for communicating between data processing devices over relatively long distances for the last several decades. Going back to the days when teletype terminals were dominant, serial communications have been used over telephone lines to allow remotely situated terminals to send messages, make inquiries of mainframe computing devices, and the like. Typically, a serial port is affixed to a piece of data terminal equipment, which is normally either a terminal or a computer, is connected to some form of data communications equipment, normally a modem. The modem modulates the digital data going to and coming from the data terminal equipment to provide a form that may be transmitted over limited bandwidth voice grade telephone lines.

Since the late 1970's, there has been an explosive growth of the use of small computers in homes and offices in the western world. Computer to computer and computer to mainframe communications have mostly been conducted via modems connected to serial ports on the computer devices. The fundamental building block of a serial port for a computer or terminal is a universal asynchronous receiver-transmitter, commonly known by the acronym UART. This device accepts parallel words or bytes from the data terminal equipment, generates appropriate timing signals, depending on the bit rate, and transmits the bytes in bit serial form, together with appropriate start, stop and parity checking bits. On the receiver side of the UART, the center of the bit times are determined, based on the approximate data rate, and serial data is clocked into a register to form a word or byte that is then available for reading out in parallel by the data terminal equipment. The UART responds to and strips start and stop bits and can give an indication of when a parity error is detected. Typically, UARTs have a status register that includes at least one line to indicate when an incoming parallel word is captured and is ready to be read out.

In the late 1970's and very early 1980's, when 300 and 1200 bits per second were standard serial data communications speeds for modems, a conventional UART, with a single parallel holding register for received words and a second register that could be filled while the first one was awaiting a read by the data terminal equipment, was sufficient to allow handling of serial data communications. Most programs and computers that handle serial data communications are connected to a UART in the serial port so that the indication of an available word for reading would generate an interrupt request to the central processor. It is then up to the applications program to read the word from the register, clear the interrupt with an interrupt acknowledge signal, and go about its business until the next interrupt was received.

Developments in the late 1980's and early 1990's caused this typically arrangement to become inadequate. First, data communications speeds available through modems increased dramatically, going from 1200 and 2400 bits per second in the early 1980's to speeds in excess of 10 kilobits per second in the early 1990's. At the same time, computer operating systems that supported concurrent processes became popular and were widely proliferated. This led to circumstances in which the conventional UART, together with the typical applications program, could not peacefully exist in such an environment. The high rate of received data led to situations in which incoming data overwrites a word awaiting read-out in a register before the central processor had an opportunity to retrieve same, leading to lost data. This occurs when the central processor is busy servicing other processes within the data communications application or another concurrently running process. Alternately, a condition known as "thrashing" occurred when the data communications process could keep up with the incoming data in real time, but at the cost of occupying virtually all of the CPU processing time so that other concurrently running processes could not be properly serviced.

In response to this, enhanced UARTs were introduced including the type 16450 and 16550 which were provided with 16 byte transmit and receive buffers. Such a prior art enhanced UART is shown as UART 5 in FIG. 1. A parallel port 6 for receiving data from the data terminal equipment and sending data to the data terminal equipment is provided. A 16 byte transmit first in first out (FIFO) buffer 7 is connected to a conventional parallel to serial converter 8 that transmit out serial data on line 9. On the receive side, serial data coming in on line 17 is converted to parallel data by converter 18 and the parallel bytes are stored in receive FIFO 19. They are then read out three data port 6 as the connected data terminal equipment has time to process same.

One feature of a typical prior art enhanced UART is selectable interrupt levels based on the fill state of the receive FIFO. A plurality of lines 21 are connected to the receive FIFO to determine when the FIFO contains one byte, four bytes, eight bytes or fourteen bytes. These are multiplexed through a multiplexer 25 that is user setable by a value in a register to select which one of lines 21 is connected to an interrupt request line 27. In this way, the user (i.e., applications programmer) can select the fill level of the receive buffer that will generate an interrupt request to the CPU that is used for servicing receipt of data.

It is known in the art to provide circuitry associated with central processing units to prioritize interrupts from a number of devices so as to distribute the servicing of interrupts in a sensible manner so that one processed is does not dominant CPU time in a way that causes other processes operating on the computer to receive inadequate service and fail. Heretofore, the application of such prior art methods to a conventional UART attempting to handle high speed data in a multi processing environment lead to situations in which data was lost due to overriding of the buffer as the CPU chose to ignore interrupt requests from the serial port in favor of smoothing out the distribution of handling interrupts among various other devices. To date, no serial port apparatus known to the inventor has provided a mechanism for providing additional buffering so as to prevent data loss, and internally inhibited the generation of new interrupts while being controlled by an application written for unbuffered or 16 byte buffered UARTs.

The provision of 16 byte FIFO buffers on the receive and transmit side is basically adequate for a CPU that is dedicated to running a well written data communications application at moderate to high data rates, but proved inadequate in more complex concurrent processing environments in the presence of high data rates and multiple processes competing for CPU time. However, much application software exists that is written for machines with an enhanced UART such as UART 5 shown in FIG. 1. Therefore, there is a need in the art for an enhanced serial port device that provides a UART circuit that allows high speed serial data communications to be reliably conducted, without data loss, in multi processing environments, such as a personal computer running the Microsoft Windows operating system with other concurrent processes competing for CPU time. Furthermore, it is highly desirable that such a device be provided in a way that will backwardly compatible with existing programs written to support a conventional 16 byte buffered UART device such as UART 5 shown in FIG. 1 yet will avoid the condition of thrashing generated by an interrupt driven data communications program transmitting and receiving data at high speeds.

SUMMARY OF THE INVENTION

The present invention was designed to meet the above described need. The present invention is embodied as a part of an improved serial port circuit that includes the basics of a type 16550 UART, and multiple enhancements to same which may be selectively employed or not, depending on the application running on the computer to which the device is connected. The overall device is specifically designed to be backwardly compatible with machines and applications designed for use with 16550 type UARTs. Furthermore, the overall device is designed to be cascadable and to have multiple ones of same resident in the computer simultaneously supporting multiple serial ports.

Basically stated, the present invention, which is embodied as a part of this device, is a set of expanded of transmit and receive FIFOs, together with scalable trigger level circuits to control the generation of service requests for data in the buffers. In particular, the present invention provides expanded buffers with scalable trigger levels for generation of service requests that are likewise expanded to approximately mimic the conventional selectable trigger levels of the type 16550 UART. This allows the present invention to be used with applications and devices that select one of the conventional trigger levels (i.e., 1, 4, 8, or 14 bytes in a 16 byte buffer) to physically select a larger number of bytes as the trigger level, in a way that will be essentially transparent to the application running on the computer. Therefore, the present invention can be used with much higher data rate modems in concurrent processing environments with respect to a conventional type 16550 UART, yet reliably handle high speed incoming and outbound data and servicing interrupts generated by the received data buffer without the loss of data.

According to another aspect of the present invention, a reinterruptable timer is employed to prevent the condition of thrashing. This timer is particularly useful in situations in which a low trigger level for a receive buffer service request has been set by an application, yet the expanded buffer used in the present invention is available to absorb much more data before calling on the CPU to empty the buffer and pass received data on to the application. The reinterruptable timer is triggered by the clearing of an interrupt request by the CPU and assures that another interrupt request is not generated for a predetermined period of time by the CPU and assures that another interrupt request is not generated for predetermined period of time after completion of servicing of the most recent one from the enhanced serial port control of the present invention.

The preferred form of the present invention is designed to be used with the AT bus on a personal computer that defines the rising edge of the signal on an interrupt request line as the interrupt request. When the interrupt request is cleared, i.e. acknowledged, by the CPU, the reinterruptable timer holds the interrupt request line low for a predetermined period, even if the setting of the trigger level or other event internal to the serial port circuit of the present invention indicates that another interrupt request should be generated. If another such internal condition is present when the timer times out, a rising edge on the interrupt request line will be generated. If no pending interrupt request has been generated internal to the device, the time out of the timer will simply enable the interrupt request line to respond to internal conditions normally.

In its most preferred form, the reinterruptable timer has a selectable time out period that is either usable selectable, or automatically determined by the response the presently used data rate and average rate of occurrence of interrupt servicing.

Therefore, it is an object of the present invention to provide an improved serial port device with expanded buffering capability that is backwardly compatible with apparatus and application programs written for use with conventional UARTs.

It is a further object of the present invention to provide a serial port with expanded receive and/or transmit buffering with scalable trigger levels for service requests that can physically allow greater amounts of data to be buffered, by the applications based on a model that a conventional 16 byte buffer is in use. It is a further object of the present invention to provide a serial port device that internally restricts the rate of its own generation of interrupt requests so as to prevent a thrashing condition in which serial port servicing occupies an inordinate amount of CPU processing time.

It is a further object of the present invention to provide an improved serial port device that internally restricts its rate of interrupt request generation and furthermore provides additional data absorption capability that prevents the overwriting of received data while the generation of the new service request is inhibited.

It is still a further object of the present invention to provide an improved serial port device that is backwardly compatible with devices and applications written for conventional UARTs yet provides significantly enhanced capabilities for applications written to take advantage of these capabilities.

It is still a further object of the present invention to provide an improved serial port device that will support modem high speed data communications in a multitasking environment in a manner that prevents data loss by overwriting and further prevents excessive occupation of CPU time by service requests from the serial port.

That the present invention meets these objects and overcomes the above noted drawbacks of the prior art will be appreciated from the detailed description of the preferred embodiment to follow.

BRIEF DESCRIPTION OF DRAWINGS

FIG. 1 is a block diagram of a conventional serial port controller including a universal asynchronous receiver/transmitter.

FIG. 3 is a detailed block diagram of the transmit first in/first out buffers within the preferred enhanced serial port controller of FIG. 2.

FIG. 4 is a detailed block diagram of the receive first in/first out buffers within the preferred enhanced serial port controller of FIG. 2.

FIG. 5 is a detailed circuit diagram of the level detect circuit for setting scalable interrupts in the preferred embodiment of the present invention.

FIG. 6 is a flow chart of the preferred steps for receiving data in the enhanced serial port controller of FIG. 2.

FIG. 7 is a diagram of the re-interruptable timer in the preferred embodiment of the present invention.

DETAILED DESCRIPTION

Figure 2:
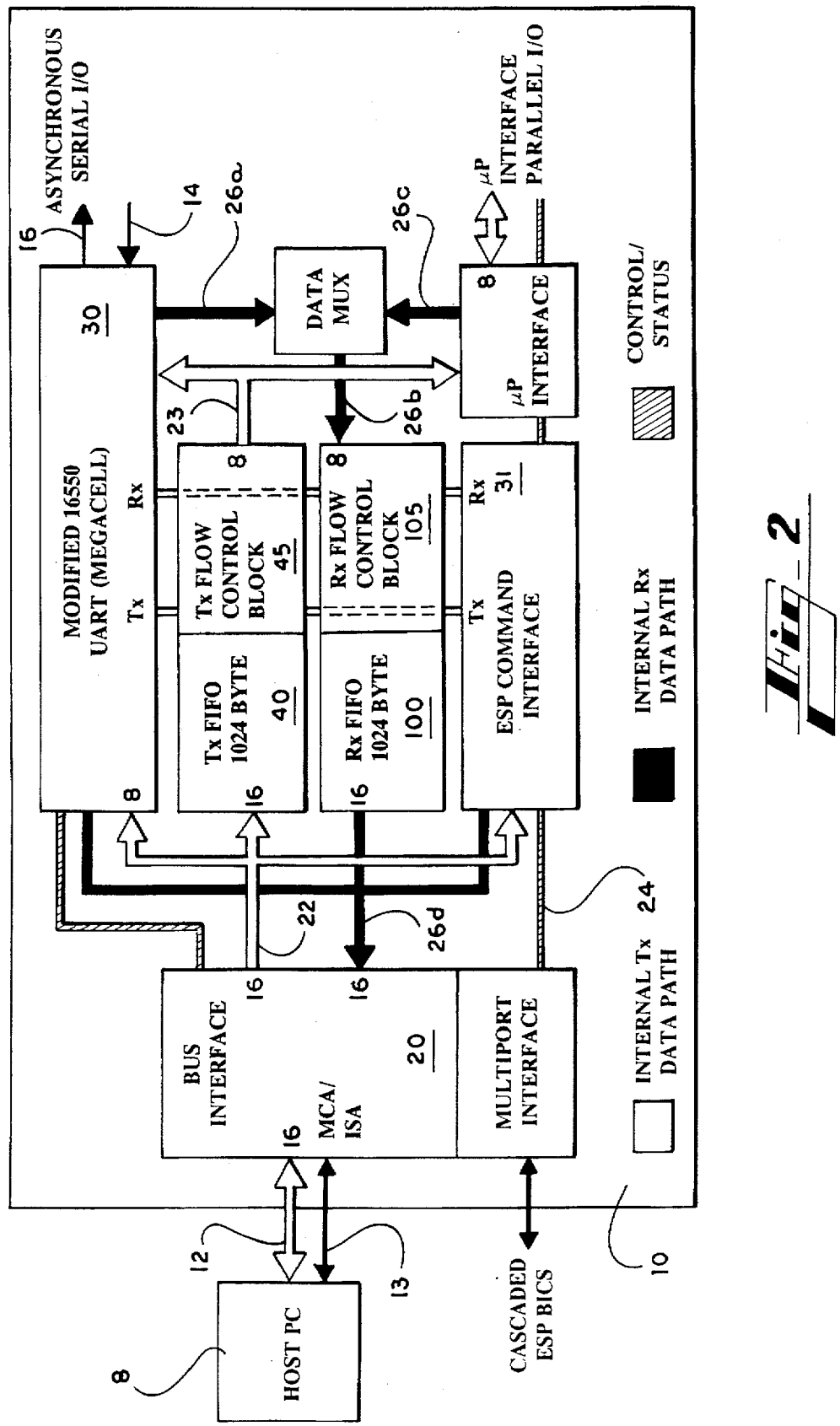
FIG. 2 is a block diagram of the preferred enhanced serial port controller of the present invention.

Turning next to the figures, in which like numerals indicate like parts, FIG. 2 is a block diagram of the preferred enhanced serial port controller 10. The preferred enhanced serial port controller 10 provides many advantages over conventional universal asynchronous receiver/transmitter (UART) circuits, such as the UART 5 shown in FIG. 1. Specifically, the preferred enhanced serial port controller 10 provides for significantly more capacity for buffering data during data communications, increased number and adjustability of the scalable trigger levels, and an improved controller for minimizing interrupts of the host computer 8.

Before describing the preferred embodiment in detail, it is informative to broadly compare the conventional UART 5 shown in FIG. 1 with the enhanced serial port controller 10 shown in FIG. 2. Significantly, the present invention retains backward compatibility with conventional serial ports including the UART 5. The enhanced serial port controller 10 includes a UART 30, and further includes large transmit and receive first in/first out (FIFO) buffers, 40 and 100, and transmit and receive control circuits, 45 and 105, respectively, outside the UART 30. In contrast, the conventional UART 5 includes only sixteen (16) byte receive and transmit FIFO buffers, 6 and 7 respectively. Furthermore, the conventional UART 5 includes only four preset scalable trigger levels: 1, 4, 8 and 14. A scalable trigger level is the number of bytes of data in a buffer that will cause the device generate a request for service to empty the buffer. The enhanced serial port controller 10 includes a greater number of scalable trigger levels, as is detailed below.

While providing the above listed advantages, the enhanced serial port controller 10 retains compatibility with conventional UARTs, such as the 16450/550 UART sold by Texas Instruments and illustrated in FIG. 1. The UART 30 is in many ways similar to the UART 5, but is modified as set forth below to provide the above-listed advantages.

The transmit side of the enhanced serial port controller 10 will now be described in greater detail. The enhanced serial port controller 10 is connected to the host computer 8 via the host personal computer data bus 12 and control bus 13, both of which are familiar to those skilled in the art. The busses 12 and 13 may each be embodied by one of many different data and control busses commonly used in computers.

Data and control signals arriving from the host personal computer 8 pass through a bus interface circuit 20. The bus interface circuit 20 accepts signals from the control bus 13 and data bus 12 and outputs the data on transmit data bus 22. The bus interface circuit 20 accepts control signals off the control bus 13 and outputs the commands on control bus 24. The bus interface circuit 20 squares up and passes on the data and control signals in a manner familiar to those skilled in the art.

The data on transmit data bus 22 is provided to the UART 30, the transmit HFO buffer 40, and the command interface 50. Commands are written to the command interface 30 to control the enhanced serial port controller 10 in a manner described below. Data that is to be transmitted from the enhanced serial port controller 10 on line 16 is written into either the UART 30 or transmit FIFO buffer 40. In a conventional mode of operation, the data can be input by the host personal computer 8 directly into the UART 30.

Data is input to the UART 30 in parallel, is converted by the UART 30 to serial, and is output from the UART 30 on line 16. The enhanced serial port controller 10 provides asynchronous, serial digital data on line 16. As is familiar to those skilled in the art, the asynchronous data is typically sent to a modem for transmission over the public switch telephone network to other locations.

Turning now to FIG. 3, a detailed block diagram of the preferred transmit FIFO buffer 40 and control circuitry 45 is shown. The low and high byte of the data are input from the host computer 8 (FIG. 2) on data bus 12. The data is multiplexed in multiplexor 44, using latch 42, onto the eight (8) bit bus 46 in a manner familiar to those skilled in the art.

The host write signal on line 47 and clock signal on line 48 from the host computer 8 are used to clock the latch 42 and multiplexor 44. The write signal on line 47 emerges from the write generator circuit 50 on line 51 and is fed to the write pointer counter 54 and the transmit FIFO buffer 40. The write signal on line 51 clocks the data on data bus 46 into the transmit FIFO buffer 40. The control signal on line 52 from the write generator circuit 50 selects between the high and low bytes on the data bus 12.

The mode signal on line 49 is also input to the write generator circuit 50. The mode signal is set to indicate whether the data is eight or sixteen bit.

Data bytes written into the transmit HFO buffer 40 are stored. The write pointer counter 54 is incremented with each write pulse on line 51 to sequentially store bytes of data in the transmit FIFO buffer 40. Those skilled in the art are familiar with counters such as write pointer counter 54. The address for storing the bytes of data emerges from the write pointer counter 54 on address bus 55. The address on bus 55 is passed through the address multiplexor 56 to the transmit FIFO buffer 40. The address multiplexor 56 selects between the write address bus 55 and the read address bus 65, discussed below, based on the FIFO read/write select signal on line 57. The signal on line 57 is received from the command interface circuit 31, described below.

Data written into the transmit FIFO buffer 40 is read from the buffer for transmission on the asynchronous serial data output line 16. The data is read under control of the transmit data ready signal on line 76. The transmit data ready signal is generated when the UART 30 is ready to transmit data, as is familiar to those skilled in the art. Thus, after a byte of data is passed through the parallel to serial converter in the UART 30 and out line 16, the next byte of data is passed to the UART 30.

The transmit data ready signal is used to clock the read pointer counter 64. The read pointer counter 64 sequentially addresses memory locations in the transmit FIFO buffer 40 to read bytes of data out on bus 23. The read pointer counter 64 is a counter familiar to those skilled in the art.

The read pointer counter 64 outputs the address to be read on address bus 65. The address bus 65 is multiplexed in address multiplexor 56 with the write address bus 55, depending on whether data is being written into or read from the transmit FIFO buffer 40.

The data stored in the transmit FIFO buffer 40 is output on data bus 23 to the UART 30. As will familiar to those skilled in the art, the data is converted from parallel to serial in the UART 30 and output on line 16.

The comparator circuits 66 and 67 support the write and read operations, respectively, described above. The comparator circuit 66 determines if the values on the write address bus 55 and the read address bus 65 are equal. If the values are equal, the transmit FIFO buffer 40 is full and writing further data would write over data that has not been read. Thus, the transmitter full signal is set on line 68, passed through OR gate 69 to inhibit writes to the transmit FIFO buffer 40, and passed to the host computer 8 via the UART 30 to inhibit further writes.

Likewise, the comparator circuit 67 is triggered when the value in the read address bus 65 equals the value in the write address bus 55 plus one. This prevents re-reading of data that would occur if the read address on bus 65 surpasses the write address on bus 55. When the value in the read address bus 65 equals the value in the write address bus 55 plus one, the transmit buffer empty signal on line 72 is set. This signal is passed through the OR gate 73 to inhibit further reads using the read pointer counter 64, and is passed to the UART 30. The UART 30 stops sending data on line 16 and performs other functions, such as dropping the standard transmit data ready signal (not shown).

The subtraction circuit 74 subtracts the value on the read address bus 65 from the value on the write address bus 55, and subtracts the calculated value from 1024 to provide an indication of the available space in the transmit FIFO buffer 40. The available space in the transmit FIFO buffer 40 is output from subtraction circuit 74 on bus 71 to the command interface 31 for making the information available to an application that supports the command interface 31. Those skilled in the art are familiar with circuits that perform the functions described for the subtraction circuit 74. Therefore, applications programs writing in contemplation of an improved serial port device such as that described herein can selectively read information from command interface 31 indicative of the value on bus 71, i.e. the free buffer space available. This allows applications to be written that can take full advantage of the buffering capability of the present invention, and even those that can rely on polling of the free buffer space value rather than responding to interrupt service requests to empty the received buffer. Similarly, it allows an applications program written in specific contemplation of the improved serial port device to check the free space in the buffer upon receipt of an interrupt service request and to selectively ignore such a request until the free space value is sufficiently small to indicate that emptying of the buffer is a high priority task.

Referring back to FIG. 2, the receive side of the enhanced serial port controller 10 is now described. The enhanced serial port controller 10 also accepts asynchronous, serial data on line 14. Asynchronous data received on line 14 is passed to the UART 50. The data is converted to parallel in the UART 50. The data may be stored in the UART 50 in a conventional mode of operation. However, in the preferred embodiment, the data is passed over receive data bus 26a and b to the receive FIFO buffer 100. Received data is passed from the receive FIFO buffer 100 to the host personal computer 8 via the receive data bus 26d, bus interface circuit 20, and data bus 12, as is described in detail below.

Turning to FIG. 4, a detailed block diagram of the receive first in/first out buffer 100 within the enhanced serial port controller 10 is set forth. Data arriving at the enhanced serial port controller 10 on asynchronous serial line 14 (FIG. 2) and is fed through the serial to parallel converter 90 in the UART 30. The serial to parallel converter is familiar to those skilled in the art.

The data is passed from the serial to parallel converter 90 is to the data multiplexor 110 over data bus 26a. When passing data from the asynchronous line 14 to the host computer 8, data is simply passed through the data multiplexor 110 to the flow control circuit 120 on data bus 26b. The write signal on line 34a is also passed through the data multiplexor 110 and to the flow control circuit 120 on line 34c.

The addressing scheme for writing data into and reading data out of the receive FIFO buffer 100 is identical to the scheme set forth above in FIG. 3 with regard to the transmit FIFO buffer 40, with the exception of using the write signal on line 34a instead of the host write signal on line 47, and the use of a read generator circuit (not shown) instead of a write generator circuit 50. Specifically, write and read pointer counters, 54' and 64' respectively, are used to track the path of data into and from the receive FIFO buffer 100 and are identical to the write and read pointer counters, 54 and 64 respectively, used with transmit FIFO buffer 40 (FIG. 3).

The data is clocked into the receive FIFO buffer 100 using the write signal on line 34a. The write signal on line 34a is generated by the UART 30 when it has received data that is ready to be passed on to the receive FIFO buffer 100. The write pointer is adjusted with each write pulse on line 34c.

The level detect circuit 130 determines when data is to be written from the receive FIFO buffer 100, as is discussed below. The level detect circuit 130 is provided with the write address bus 55' and read address bus 65'. The level detect circuit 130 outputs receive data ready signal on line 132 to bit 0 in the UART line status register 134. Bit 0 in the UART line status register 134 is passed to the host computer 8 on line 136 as an interrupt request. The host computer 8 responds to the interrupt request on line 136 by reading data from the receive HFO buffer 100, as set forth below.

Data is read from the receive FIFO buffer 100 using the host read signal on line 58. A read generator circuit 121 is substituted for the write generator circuit 50 in FIG. 3, and clocks the data out of the receive FIFO buffer 100. A host read signal, mode select signal, and a clock generate the read signal on line 122 through the read generator circuit in the same manner as the write generator circuit 50 was used.

The host read signal is generated by the host computer 8 and passed to the UART 30 and receive FIFO buffer 100 through the bus interface circuit 20 (FIG. 2). The UART 30 sends an interrupt request to the host computer 8 when the enhanced serial port controller 10 is ready to transfer data to the host computer 10.

Referring to FIGS. 4 and 5, the apparatus and method for detecting the level of data in the receive FIFO buffer 100 are detailed. FIG. 5 is a detailed circuit diagram of the level detect circuit 130 for setting scalable interrupts in the preferred embodiment of the present invention.

The command interface circuit 31 in FIG. 4 has an array of registers, including an enhanced serial mode register 126. The host computer 8 writes information into the enhanced serial mode register 126. The register 126 is addressed via the bus interface circuit 20. The register 126, and other registers in the command interface circuit 31, accept the enhanced serial interface commands familiar to those skilled in the art.

The enhanced serial interface commands typically include two types of commands, a "Comm 1" and "Comm 2." The Comm 1 command identifies a column of registers that is to be written, and the sequence of Comm 2 commands are the data written into the column of registers. For example, if the flow control registers were to be adjusted, the command "set flow levels" would be written to Comm 1, and bytes of control data are sequentially written to the flow control registers. Thus, the grouping of registers to be written are identified by the Comm 1 command, and the registers in the selected grouping are written to sequentially via the Comm 2 commands.

An enhanced serial interface command is thus written into the register 126. The trigger levels are scalable up from 1, 4, 8 and 14 to 1, 64, 256 and 512 bytes. If the trigger levels are scaled, bit 7 in register 126 is set. The scale trigger level signal on line 128 is fed to a multiplexor 138 in the level detect circuit 130.

The UART 30 includes a UART FIFO control register 136, (FIG. 4) which has trigger level select bits seven (7) and six (6). Bits seven and six are fed via bus 139 to the multiplexors 142a and 142b in the level detect circuit 130. The multiplexors 142a and b collectively provide eight output lines 144a–h representing the scalable trigger values: 1, 4, 8, 14, 1, 64, 256 and 512. The signal on line 128 determines whether the trigger level is selected from the first four levels on lines 144a–d or the last four levels 144e–h set forth above. Two signals on the lines 144a–h, one each from lines 144a–d and lines 144e–h, are set by multiplexors 142a and b. The signal on line 128 selects between the two signals fed into the multiplexor 146. The multiplexor 146 outputs the selected value, such as two-hundred and fifty-six, on bus 147.

The value on bus 147 is compared with the number of data bytes written into the receive FIFO buffer 100, as provided by the adder circuit 150. The number of bytes written into the receive FIFO buffer 100 is output on bus 152, and received in comparator 138. When the number of bytes written into the receive FIFO buffer 100 equals the selected scalable trigger level on bus 147, the comparator 138 outputs the trigger level reached signal on line 132. Referring to FIG. 4, the trigger level reached signal on line 132 is fed to the UART 30 to cause the host computer to be interrupted.

FIG. 6 is a flow chart of the preferred steps for receiving data in the enhanced serial port controller 10 of FIG. 2. It will be understood that FIG. 6 represents the overall logic employed by the conventional application when running on a computer to which an embodiment of the present invention is attached. At step 160 the application writes commands into both command interface 31 and registers of the UART megacell 30 (FIG. 2) to activate the FIFOs. At step 161 commands are written to command interface 31 to set selection of the scale factor, i.e., to control the writing of bit 7 of register 126 in command interface 31 to control the use the scalable trigger level of the present invention, and to write the two higher order bits into register 134 of UART cell 30 to select a particular one of the scalable interrupt levels. Thus, a particular value written into the register controlling the values on lines 139 (FIG. 5) will select from the set of [1, 4, 8, 14] if conventional levels are used. If bit 7 of register 126 (FIG. 5) is set to the opposite value, one of the enhanced scalable values taken from the set [1, 64, 256, 512] will be selected.

The process next enters a loop consisting of test step 162 and No branch 163 which determines whether the trigger level has been reached. While this is logically shown as a loop, it should be understood that this is logically an entry point for an interrupt service routine that responds to the generation of a receive buffer interrupt service request from the preferred embodiment of the present invention. A simple data communications program setting this trigger level to 1 that was not designed for a multitasking environment could indeed continually test whether the trigger level has been reached and branch according to that condition.

Irrespective of the particular implementation, when a condition indicating a request for service of the received buffer exists, Yes branch 165 will be taken from step 162. The next step, 166, represents an internal process of the preferred embodiment. When the trigger level is reached, line 132 (FIG. 5) becomes asserted and the received data ready (RXRDY) bit in the UART status register is set indicating to the host that the receive buffer should be serviced.

The next steps represent conventional serial communications programming techniques. Normally, an application will perform a routine indicated at step 167 to pass a predetermined number of bytes from the receive buffer back to application. The predetermined number is normally that which the application "thinks" it has set as a trigger level for UART buffer. When this is completed, most applications will next execute a step such as 168 to determine whether the buffer is empty, i.e., to check the receive data ready status bit. If the buffer is not empty, No branch 168 is taken to step 169 at which the next byte is read, and the routine loops to branch 170 and step 168 that again tests the status of the buffer. This loop will continuously be executed until the buffer is empty, at which time Yes branch 171 is taken to exit point 172.

It should be noted that the practice of including buffer testing at step 168 after the passing of the expected predetermined number of bytes at 167 is helpful in assuring backward compatibility of the present invention with existing applications written for support prior art UARTs. Even if the application has set the trigger level to a relatively low value, such as 4 bytes, the entire buffer will be emptied upon each servicing of an interrupt to empty the received buffer.

This, in conjunction of the reinterruptable timer, described below in greater detail in connection with FIG. 7, allows the present invention to reliably pass relatively large blocks of data to applications that expect small buffer sizes. In the absence of the reinterruptable timer, the low trigger level would continually generate interrupts in spite of the fact that only a very small percentage of the buffer capacity was used. The use of the timer to inhibit subsequent generation of interrupts for a predetermined period of time allows a significant portion of the buffer capacity to be utilized, even when the trigger level is set to a low value, and further allows the CPU time to attend to other processes before returning to service the next request from the preferred embodiment to service its received buffer. In this way the reinterruptable timer and the expanded buffer cooperate to assist in backward compatibility and prevent thrashing and data loss.

FIG. 7 shows an embodiment of the reinterruptable timer of the present invention. The basic input is the internal indication of the need of service request that appears on line 132 from level detect circuit 130 (FIG. 5). This clocks a storage device, such as D type flip-flop 180 to set output line 181 high indicating that an interrupt request should be generated. Line 181 is one input to AND gate 182 the output of which is provided to status register 134 to generate the external indication of an interrupt request from the UART.

Assume for the moment, as will normally be the case, that line 183 is at a logical one and thus the rising edge on line 181 is passed through gate 182 to its output. The rising edge on an interrupt request is recognized by the host CPU as an interrupt request. According to the convention used with Intel processors and other processors commonly used in implementing personal computers, the requesting device will hold its interrupt request high until it receives an interrupt acknowledge signal from the CPU acknowledging the interrupt and indicating that the interrupt request line should be cleared for subsequent possible interrupt request. This conventional arrangement precludes a single device from generating multiple sequential interrupts until at least the most recent one has been serviced.

An interrupt acknowledge signal from the CPU is provided on line 185 which is connected to a clear input 186 a flip-flop 180 and a trigger input 187 of a one shot timer 188. The asserted output from timer 188 appears on line 189 as one input to NAND gate 191. The other input to NAND gate 191 is a timer enable signal on line 192. The timer enable signal on line 192 is a control signal from command interface 31 that determines whether the reinterruptable timer of the present invention is to be utilized. If the signal on line 192 is not asserted (logical zero) then NAND gate 191 forces line 183 to a high level thus causing the output written to status register 134 to respond only to the internal interrupt request condition on line 181. Thus, negation of the timer enable signal on line 192 causes the timer circuit to ignore one shot timer 188. On the assumption that the timer is enabled, i.e., that line 192 is the logical one, the output on line 183 will be the inverse of the signal on line 189.

Returning again to the condition in which flip-flop 180 has been set indicating that an interrupt service request has been generated by the UART, next assume an interrupt acknowledge is provided on line 188. This clears flip-flop 180 thus internally resetting the interrupt request status in the preferred embodiment. The same signal is provided to trigger input 187 and triggers one shot timer 188, taking line 189 high. This forces line 183 low for the period of the timer and holds the external interrupt request on line 134 low for the period of timer 188.

If no internal service request is generated on line 132 during the period of timer 188, time out causes line 183 to go high and an external interrupt service request will be generated since there is a rising edge on line 181. On the other hand, the generation of an internal request for service by a rising edge on line 132 that occurs prior to the time out of timer 188 will cause line 181 to go high. However, this will be blocked from status register 134 by the logical zero that is held on line 183 by a timer 188. This condition will maintain until timer 188 time out.

Therefore, if an internal request for service is generated, such as the buffer filling to the selected trigger level, this interrupt request is not transmitted to the host until the time out of timer 188 reestablishes a logical one on line 183, thus causing a rising edge on the output of NAND gate 182 which generates the next external interrupt request to the host. In this way timer 188 prevents the occurrence of a subsequent interrupt request until a predetermined period of time following servicing of the most recent request made by the enhanced serial port control of the present invention.

The last input to the timer circuit of FIG. 7 is a period select signal on line 193. This is generically indicated as controlling the period of timer 188. This can be accomplished by selecting resistor values controlling the time constant of a one shot multivibrator, or by implementation as multiple lines controlling the scale of a counter timing device. It should be understood that a conventional one shot multivibrator such as 188 has been shown to illustrate the use of a programmable timing device and that scalable counter and other timing devices that will be recognized as providing an equivalent timing operation by those skilled in the art can all be employed, interchangeably, in constructing embodiments of the present invention. Therefore, in its most preferred form, the timer of the present invention provides a selectable predetermined period of time in which to inhibit the next subsequent interrupt after an occurrence of a most recent interrupt or interrupt service.

The preferred embodiment of the present invention is constructed as part of the overall enhanced serial port device described hereinabove using one micron CMOS cell based integrated circuit technology. It is preferably packaged in a 144 pin quad flat pack enclosure suitable for surface mounting on the printed circuit board. It should be understood that the invention described herein forms but a portion of the overall controller and serial port embodied by the above described intergrated circuit. Those skill in the art will recognize that other equivalent structures may be used to construct embodiments of the present invention including discrete MSI and LSI integrated circuits, a collection of memories and registers including an intelligent controller running under stored program control, and other similar arrangements.

In view of the foregoing description of the preferred embodiment in its intended environment, other embodiments of the present invention will suggest themselves to those skilled in the art. Therefore, the scope of the present invention is to be limited only by the claims below and equivalents thereof.

I claim:

1. A controller for use with a serial port in a computer, said controller being utilized with a conventional universal asynchronous receiver/transmitter (UART), said UART being associated with said serial port, said UART including receiver and transmitter buffers, said controller comprising:

an expanded buffer, said expanded buffer being operationally connected to a predetermined one of: said transmitter buffer for storing data to be transmitted to said UART via said serial port, or said receiver buffer of said UART for storing data received from said UART via said serial port;

a scalable trigger circuit, said scalable trigger circuit being associated with said expanded buffer, for detecting when said data in said expanded buffer is equal to a predetermined trigger level and producing a service request signal each time said data in said expanded buffer is equal to said predetermined trigger level; and a timer responsive to said service request signal for providing an interrupt signal to said computer, said timer resetting said interrupt signal following servicing of said interrupt signal, said timer having a predetermined time-out period started by said servicing of said interrupt signal, said timer being non-responsive to a subsequent said service request signal by not sending a subsequent interrupt signal until said time-out period has elapsed.

2. A controller for use with a serial port in a computer, said controller being utilized with a conventional universal asynchronous receiver/transmitter (UART), said UART being associated with said serial port, said UART including receiver and transmitter buffers, said controller comprising:

a first buffer, said first buffer being operationally connected to said transmitter buffer for storing data to be transmitted to said UART via said serial port;

a first scalable trigger circuit, said first scalable trigger circuit being associated with said first buffer, for detecting when said data in said first buffer is equal to a predetermined trigger level and producing a service request signal in response thereto;

a second buffer, said second buffer being operationally connected to said receiver buffer of said UART for storing data received from said UART via said serial port;

a second scalable trigger circuit, said second scalable trigger circuit being associated with said second buffer, for detecting when said data in said second buffer is equal to a predetermined trigger level and producing a service request signal in response thereto;

a service request queue buffer for receiving said service request signals from said first and second scalable trigger circuits for providing an interrupt signal to said computer; and a timer for resetting said interrupt signal following servicing of said interrupt signal, said timer having a predetermined time-out period started by said servicing of said interrupt signal, said timer preventing said service request queue buffer from providing a said interrupt signal in response to a subsequent said service request signal until said time-out period has elapsed.

* * * * *